(12) United States Patent
Moecklin et al.

(10) Patent No.: US 8,261,628 B2
(45) Date of Patent: Sep. 11, 2012

(54) ELECTROMECHANICAL DRIVING DEVICE FOR USE IN A TAILGATE OF A MOTOR VEHICLE

(75) Inventors: Stefan Moecklin, Baden-Baden (DE); Mario Huesges, Buehlertal (DE); Ulrich Metz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 583 days.

(21) Appl. No.: 12/374,689

(22) PCT Filed: Oct. 1, 2007

(86) PCT No.: PCT/EP2007/060372
§ 371 (c)(1), (2), (4) Date: Jan. 22, 2009

(87) PCT Pub. No.: WO2008/061836
PCT Pub. Date: May 29, 2008

(65) Prior Publication Data
US 2010/0132491 A1    Jun. 3, 2010

(51) Int. Cl.
- *F16H 55/17* (2006.01)
- *F16H 1/16* (2006.01)
- *F16H 29/20* (2006.01)
- *B60P 1/267* (2006.01)
- *B60J 3/00* (2006.01)
- *B60S 1/02* (2006.01)

(52) U.S. Cl. ............. 74/435; 74/425; 74/89.14; 296/50; 296/96.15; 15/250.31

(58) Field of Classification Search ............ 74/425, 74/434, 435, 89.14; 296/50, 57.1, 56, 96.15, 296/106; 15/250.3, 250.31, 250.16
See application file for complete search history.

(56) References Cited

U.S. PATENT DOCUMENTS 3,688,332 A * 9/1972 Bellware .................... 15/250.16
(Continued)

FOREIGN PATENT DOCUMENTS
JP    2004210079    7/2004

OTHER PUBLICATIONS
PCT/EP2007/060372 International Search Report.

*Primary Examiner* — Justin Krause
*Assistant Examiner* — Matthew R Vaerewyck
(74) *Attorney, Agent, or Firm* — Michael Best & Friedrich LLP

(57) ABSTRACT

An electromechanical driving device (1) for use in a tailgate of a motor vehicle, with an electric motor (2) for the rotary drive of a spur gear (4) which is accommodated in a gear housing (3) and is operatively connected to a gear arrangement (5) in order to drive an output shaft (19) for a window wiper mechanism, wherein the spur gear (4) is accommodated rotatably in the gear housing (3) by means of a co-rotating spur gear shaft (6), wherein a shaft section (7) of the spur gear shaft (6) extends out of the gear housing (3) on which means for actuating a closing mechanism (8) for closing the tailgate and/or a tailgate window are accommodated. An electromechanical driving device (1) for use in a tailgate of a motor vehicle is therefore provided, said driving device, which is used to selectively actuate a wiper mechanism or a closing mechanism, having a simple design and comprising a gear housing which is designed in accordance with a known construction for driving a wiper mechanism.

21 Claims, 4 Drawing Sheets

U.S. PATENT DOCUMENTS

| | | | |
|---|---|---|---|
| 4,794,818 A * | 1/1989 | Eustache et al. | 74/600 |
| 4,893,039 A * | 1/1990 | Isii | 310/89 |
| 5,274,875 A * | 1/1994 | Chou | 15/250.19 |
| 5,694,812 A * | 12/1997 | Maue et al. | 74/471 R |
| 5,841,249 A * | 11/1998 | Zimmer et al. | 318/10 |
| 5,844,382 A * | 12/1998 | Dan | 318/10 |
| 5,903,114 A * | 5/1999 | Miller et al. | 318/10 |
| 5,907,885 A | 6/1999 | Tilli et al. | |
| 5,916,327 A * | 6/1999 | Maue et al. | 74/471 R |
| 5,924,324 A * | 7/1999 | Kilker et al. | 74/89.18 |
| 5,979,256 A | 11/1999 | Kilker et al. | |
| 6,075,298 A * | 6/2000 | Maue et al. | 310/12.14 |
| 6,116,110 A * | 9/2000 | Maue et al. | 74/471 R |
| 6,449,798 B1 * | 9/2002 | Rivin et al. | 15/250.3 |
| 6,792,643 B1 * | 9/2004 | Ponziani | 15/250.31 |
| 7,669,275 B2 * | 3/2010 | Yagi | 15/250.31 |
| 7,670,228 B2 * | 3/2010 | Matsumoto et al. | 464/73 |
| 7,685,670 B2 * | 3/2010 | Yagi et al. | 15/250.3 |
| 2001/0013236 A1 | 8/2001 | Weyerstall et al. | |

* cited by examiner

Fig. 1
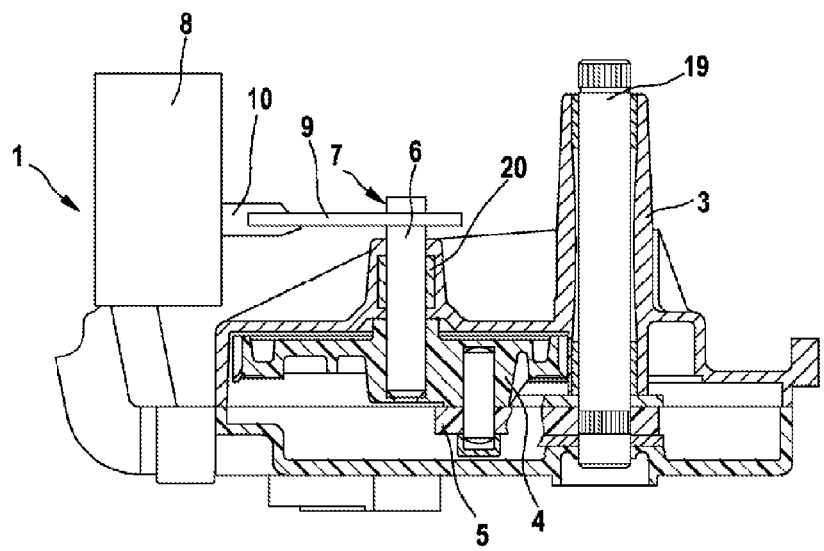
Fig. 1A
Fig. 2
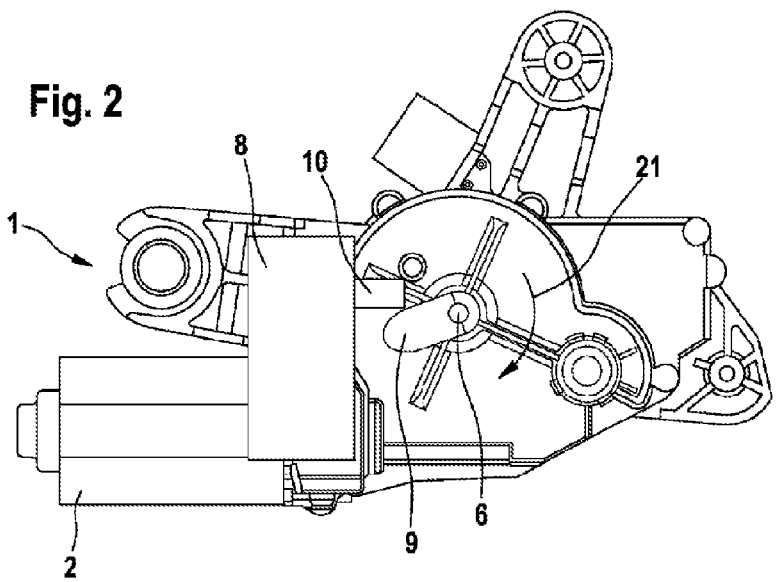

ELECTROMECHANICAL DRIVING DEVICE FOR USE IN A TAILGATE OF A MOTOR VEHICLE

BACKGROUND AND SUMMARY OF THE INVENTION

The present invention relates to an electromechanical driving device for use in a tailgate of a motor vehicle.

European patent EP 0 937 187 B1 discloses an electromechanical driving device of the generic type. The device is intended for use in a tailgate of a motor vehicle and comprises an electric motor for driving in rotation a spur gear which is accommodated in a transmission housing and which is operatively connected to a transmission arrangement in order to drive an output shaft for a windshield wiping device. In addition, the electromechanical driving device is mechanically connected to a closing device for closing the tailgate, wherein the device itself is embodied as a driving device for a rear windshield wiping device, and the electric motor serves as an electric drive for actuating the wiping device by means of a transmission arrangement. In order to actuate the closing device and in order to drive the wiping device, the electromechanical driving device is of modular design, wherein the electric motor can be actuated in both rotational directions, and in one rotational direction the transmission actuates the force transmitting train to the wiping device, and in the other rotational direction it actuates the force transmitting train to the closing device. In this way, the wiping device or the closing device can optionally be actuated as a function of the rotational direction of the electric motor.

In such a driving device, a freewheel is necessary so that when the wiping device is actuated the force transmitting train to the closing device is interrupted, while, on the other hand, the force transmitting train to the wiping device has to be interrupted if the closing device is to be actuated. According to the known embodiments, drivers are provided in the spur gear of the driving device for this which interact with an actuating lever, and the interaction starts or fails to occur depending on the rotational direction. The actuating lever must, in this context, be connected here in a structurally complicated way by means of a cable pull to a connecting member which brings about a necessary rotation in the closing device which is analogous to that of the door key in the tailgate. According to the embodiment in the prior art, a specially configured transmission housing is also necessary, which transmission housing accommodates the actuating lever and the cable pull which is embodied as a Bowden cable, and in addition connects the closing device to the driving device in order itself to provide the modular design of the driving device with the closing device.

This results in the object of the present invention of providing an electromechanical driving device for use in a tailgate of a motor vehicle which has a simple design for generating optional actuation of a windshield wiping device or of a closing device and comprises a transmission housing which is embodied according to a known design for driving a windshield wiping device.

The invention includes the technical teaching that a shaft section of the spur gear shaft extends out of the transmission housing on which means for actuating a closing device for closing the tailgate and/or a tailgate windshield are accommodated.

The invention proceeds from the idea, on the basis of a driving device having a transmission housing of a known design, of merely modifying the length of the spur gear shaft for the sake of simplification, with the result that a shaft section extends out of the transmission housing in order to provide the possibility of accommodating the means for actuating the closing device for closing the tailgate and/or a tailgate windshield. The closing device can be designed both to close the tailgate, such as are known, for example, in station wagons, compact vehicles or compact cars, wherein depending on the way in which the tailgate is embodied the tailgate windshield itself can be made such that it can be opened or closed.

The spur gear shaft is connected to the spur gear in a rotationally fixed fashion, with the result that the rotational movement of the spur gear is transmitted to the spur gear shaft, and the shaft section, extending out of the transmission housing, of the spur gear shaft also co-rotates.

According to one advantageous embodiment of the means for actuating the closing device, said means comprise a freewheeling device which causes the closing device to be actuated when the spur gear shaft rotates in a first rotational direction, and causes freewheeling of the spur gear shaft in an opposite second rotational direction. Depending on the rotational direction of the electric motor, the spur gear shaft can either execute right-handed rotation or left-handed rotation, which is described by the first rotational direction or the opposite second rotational direction. The freewheeling device is part of the force transmitting train between the driving device and the closing device here.

According to one advantageous embodiment of the freewheeling device, said device has an actuating lever which is accommodated in a co-rotating fashion on the shaft section of the spur gear shaft and is operatively connected to a closing device lever which is embodied in a wedge shape in the rotating direction of the actuating lever. The actuating lever can be pressed onto the shaft section or connected to it in some other rotationally fixed fashion. If the spur gear shaft rotates, the actuating lever also rotates in a rotational plane. A closing device lever extends into the rotational plane from the closing device, wherein the closing device lever is of wedge-shaped design. If the actuating lever rotates as a result of the rotation of the spur gear, the actuating lever can run up against the wedge-shaped closing device lever in order to close the force transmitting train between the driving device and the closing device.

The actuating lever is advantageously of elastically sprung design in the direction of extent of the spur gear shaft, with the result that said actuating lever runs up against the wedge-shaped closing device lever in a positively locking fashion in order to actuate the closing device in the first rotational direction, and in the second rotational direction it slides away in a sprung fashion over the wedge-shaped closing device lever in order to bring about the freewheeling of the spur gear shaft. The wedge-shaped configuration of the closing device lever relates to a wedge-shaped cross section, with the direction of the wedge being in the rotational plane of the actuating lever. If the actuating lever rotates in the first rotational direction, it can also run up at least on the end side against the blunt side of the wedge cross section of the closing device lever in order to transmit the actuating force to the closing device in a positively locking fashion. If the actuating lever rotates in the second rotational direction, the actuating lever slides away over the closing device lever since the latter does not bring about any positive locking with the closing device lever on the running-up side of the wedge cross section. A freewheeling device is therefore provided, and in this context, for the purpose of reliable actuation of the closing device, at least one full rotation of the spur gear is necessary to ensure that the actuating lever runs up against the blunt side of the wedge-shaped cross-sectional profile of the closing device lever.

According to one further advantageous embodiment of the freewheeling device there is provision for the latter to be embodied in the form of a sleeve freewheel which is arranged on the shaft section of the spur gear shaft and on which the actuating lever is accommodated.

A sleeve freewheel comprises two sleeve sections which are placed concentrically one in the other and between which clamping bodies are introduced with the result that the outer sleeve can be rotated with respect to the inner sleeve in only one rotational direction and is blocked in the other rotational direction. The sleeve freewheel is pressed with the inner sleeve onto the shaft section of the spur gear shaft, with the actuating lever being connected to the outer sleeve of the sleeve freewheel. If the shaft section of the spur gear shaft rotates in the first rotational direction, the rotational movement is transmitted from the inner sleeve to the outer sleeve of the sleeve freewheel and the actuating lever can co-rotate. If, on the other hand, the shaft section of the spur gear shaft rotates in the second rotational direction, the rotational movement is not transmitted from the inner sleeve of the sleeve freewheel to the outer sleeve, and the actuating lever is not made to rotate.

A spring element is advantageously arranged between the actuating lever and the transmission housing in order to prevent undesired rotating back of the actuating lever in the second rotational direction. This enables a defined position of the actuating lever to be ensured, in which case the spring element can be embodied, for example, in the form of a small leaf spring. The leaf spring can come to bear laterally against the actuating lever, with the result that the actuating lever is positioned only a few angular degrees before locking with the closing device lever.

A further advantageous embodiment provides that a second freewheeling device is arranged between the spur gear and the transmission arrangement, which freewheeling device interrupts the transmitting of movement to the transmission arrangement when the spur gear rotates in the first rotational direction, and in the opposite second rotational direction it causes the movement to be transmitted. The first freewheeling device brings about a rotational-direction-dependent interruption of the force transmitting train in the direction of the closing device, while the second freewheeling device brings about a rotational-direction-dependent interruption of the force transmitting train in the direction of the transmission arrangement.

The second freewheeling device advantageously comprises a guide groove which is provided in a planar fashion in the spur gear and has a ramp-shaped raised portion, wherein a spring-loaded bolt, which is connected to the transmission arrangement, is guided in the guide groove. The ramp-shaped raised portion is bounded by a run-up side and by a stop side, and during a rotation of the spur gear the bolt slides away over the run-up side in the first rotational direction, and in the case of a rotation in the second rotational direction it runs up against the stop side in a positively locking fashion, with the result that the movement can be transmitted to the transmission arrangement. The ramp-shaped raised portion is provided on the bottom in the guide groove and one, two or four thereof can be provided on the full circle of the guide groove within the planar side of the spur gear. It is therefore no longer possible to achieve the positively locking transmission of force via the stop side only at a maximum rotational angle of 360° but now it can even be achieved at 180°, 120°, etc. A helical spring applies force to the bolt and presses it against the base face of the guide groove. If the spur gear runs in the first rotational direction, the bolt slides away over the bottom side of the guide groove and when the ramp is reached it slides up onto the ramp over its oblique side and when the end of the ramp is reached it clicks back into the bottom face of the guide groove through the application of spring force. It is therefore possible to dispense with transmission of the rotational movement of the spur gear to the transmission arrangement. However, if the spur gear rotates in the direction of the second rotational movement, the ramp runs up with the stop side against the bolt, with the result that the rotational movement can be transmitted to the transmission arrangement.

According to a further embodiment of the second freewheeling device, the guide groove which is provided in a planar fashion in the spur gear is embodied with a locking spring, wherein when the spur gear rotates in the first rotational direction, the bolt which is guided in the guide groove slides away over the locking spring, and in the case of rotation in the opposite second rotational direction it runs up in a positively locking fashion against the locking spring, with the result that the movement can be transmitted to the transmission arrangement. The compression spring which is arranged on the rear of the bolt, for pressing the bolt against the guide path, is therefore dispensed with since the locking spring provides the resilience in order to slide away under the bolt and run up against the bolt in a positively locking fashion in the second rotational direction. The locking spring can, however, also be embodied as a spring-loaded locking element which projects out of the guide path in a catch-like fashion, and it can be pressed down through the bolt when it runs over the bolt in the freewheeling direction and forms a stop side in the locking direction in order to close the force transmitting train of the spur gear to the transmission arrangement.

As has already been described in the embodiment of the first freewheeling device, it is advantageously possible for the second freewheeling device also to be embodied in the form of a sleeve freewheel which is arranged on the spur gear shaft and on which a transmission lever, which is operatively connected to the transmission arrangement, is arranged. The spur gear shaft can specifically also have a prolonged section in the opposite direction to the shaft section, which prolonged section extends into the transmission housing. The sleeve freewheel can be pressed onto this shaft section in the form already described above and can bring about the freewheeling in the first rotational direction in a known method of functioning, and in the second rotational direction it can transmit the rotational transmission of the inner sleeve to the outer sleeve of the sleeve freewheel and therefore drive the transmission arrangement. The transmission arrangement can be embodied, for example, as a conversion gear mechanism, in which case a four-bar mechanism arrangement also constitutes a possible embodiment. In transmission arrangements of the known embodiments, the spur gear firstly comprises an eccentric transmission bolt to which a transfer lever is arranged in an articulated fashion. According to the present embodiment, the eccentric arrangement of the transmission bolt is implemented by means of a transmission lever which is connected in an articulated fashion to the conversion element. The transmission lever itself is arranged by means of the sleeve freewheel on the prolonged side of the spur gear shaft.

In order to provide a modular design of the electromechanical driving device, the closing device is arranged on the transmission housing itself. The electromechanical driving device therefore forms the drive both for the windshield wiping device and for the actuation of the locking means of the tailgate and/or of the tailgate windshield, in which case all the components can be embodied as a premountable unit. Said unit has to be integrated in a modular fashion for mounting in the tailgate.

Further measures which improve the invention are illustrated in more detail below together with the description of a preferred exemplary embodiment of the invention on the basis of the figures.

BRIEF DESCRIPTION OF THE DRAWINGS

FIG. 1 shows a cross-sectional side view of the electromechanical driving device in which the first freewheeling device is illustrated;

FIG. 1A shows schematic representation of an end view of the closing device lever and the actuating lever.

FIG. 2 shows a plan view of the electromechanical driving device with the first freewheeling device according to FIG. 1;

DETAILED DESCRIPTION

Figure 3:
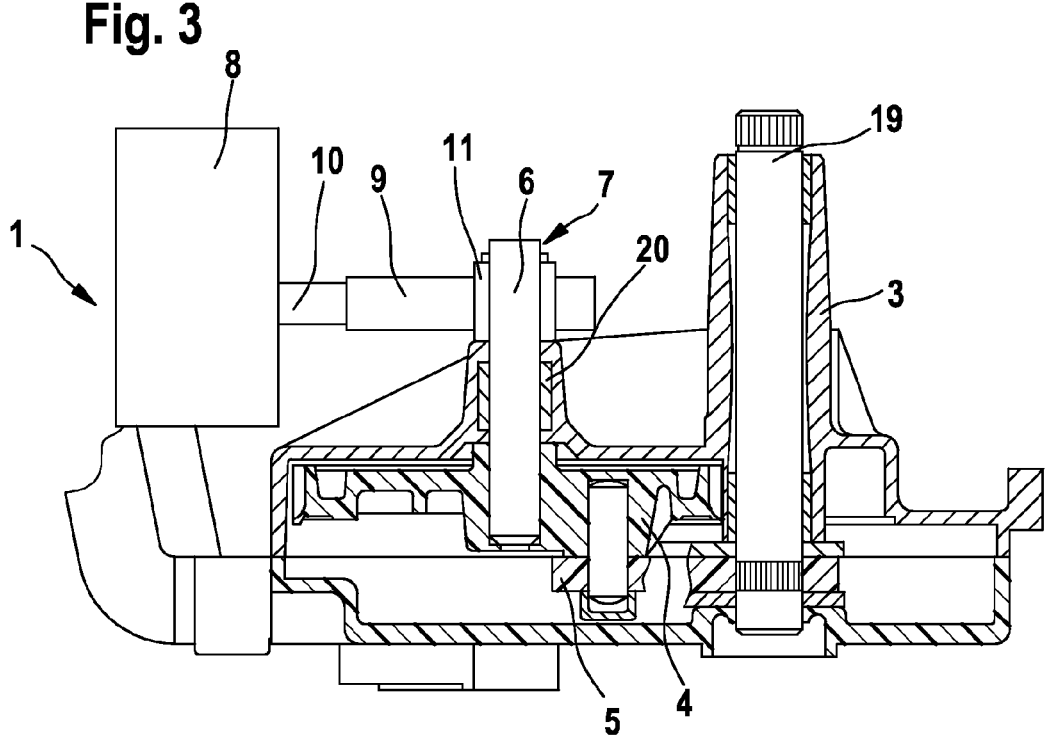
FIG. 3 shows a cross-sectional side view of the electromechanical driving device with a further embodiment of the first freewheeling device.

FIGS. 1 and 2 show an electromechanical driving device 1 which comprises a transmission housing 3 in which a spur gear 4 is rotatably accommodated, which spur gear 4 interacts with a transmission arrangement 5. The transmission arrangement 5 is also accommodated in the transmission housing 3 and is connected to an output shaft 19. The spur gear 4 is made to rotate by means of an electric motor 2, wherein the spur gear 4 transmits the rotational movement to the transmission arrangement 5, and the force transmitting train to the output shaft 19 is formed to actuate a windshield wiping device. The transmission arrangement 5 is illustrated only partially and is embodied as a conversion gear, with the result that the rotational movement of the spur gear 4 is converted into an oscillating movement of the output shaft 19.

The spur gear 4 is accommodated on a spur gear shaft 6 which is rotatably accommodated in the transmission housing 3 by means of a schematically illustrated sintered bushing 20. The transmission housing 3 is an aluminum cast component or plastic injection molded component and comprises a hollow-cylinder-like integrally molded-on portion into which the sintered bushing 20 is introduced. The spur gear shaft 6 extends with a shaft section 7 out of the hollow-cylinder-like integrally molded-on portion of the transmission housing 3 and serves to accommodate an actuating lever 9. The spur gear shaft 6 co-rotates with the rotational movement of the spur gear 4, with the actuating lever 9 also being connected in a rotationally fixed fashion to the spur gear shaft 6. A closing device lever 10, which is attached to a closing device 8, extends into the rotational plane of the actuating lever 9. The closing device 8 is illustrated only schematically and is located on the rear side of the transmission housing 3, with the closing device 8 being mechanically attached to the transmission housing 3 in a way which is not illustrated in more detail. The actuating lever 9 is embodied as a spring element which is of flat design, with the result that the actuating lever 9 can bend in a spring elastic fashion in the direction of extent of the spur gear shaft 9. The closing device lever 10 has a wedge-shaped cross section which is illustrated in more detail in the illustration in FIG. 1A.

FIG. 2 shows a plan view of the driving device 1 according to FIG. 1. The actuating lever 9 can therefore be seen from the viewing direction of the longitudinal extent of the spur gear shaft 6, with an arrow 21 being illustrated which indicates the rotation of the spur gear shaft 6 and therefore the rotation of the actuating lever 9. If the actuating lever 9 impacts, in its rotation, against the closing device lever 10 of the closing device 8, said actuating lever 9 transmits an actuating force to the closing device lever 10 as a function of the rotational direction. If the actuating lever 9 rotates in the direction of the arrow 21, it runs up against the wedge-shaped closing device lever 10 and impacts against the planar side of the wedge-shaped lever. Force can therefore be transmitted to the closing device lever 10, and the closing device 8 is actuated. However, if the actuating lever 9 rotates in the opposite direction to the arrow 21 (see FIG. 1A), the actuating lever 9 slides away over the wedge-shaped closing device lever 10, and freewheeling of the spur gear shaft 6 is brought about. As a result, the actuating lever 9 and the closing device lever 10 form, with a wedge-shaped cross-sectional design, a first freewheeling device which has the effect that actuation of the closing device 8 is actuated only in a first rotational direction (rotational direction of the arrow 21), while in the opposed second rotational direction of the spur gear shaft 6 freewheel is provided.

A further embodiment of the first freewheeling device between the spur gear shaft 6 and the closing device 8 is shown in the cross-sectional side view of the driving device according to FIG. 3. In this embodiment also, an actuating lever 9 is firstly provided, which actuating lever 9 co-rotates with the rotation of the spur gear shaft 6 and can run up against the closing device lever 10. However, the actuating lever 9 is attached by means of a sleeve freewheel to the shaft section 7 of the spur gear shaft 6. The sleeve freewheel 11 is shown only schematically and comprises two cylinder sections which are positioned concentrically one in the other, with the inner cylinder section being pressed onto the shaft section 7 and the outer sleeve section being connected to the actuating lever 9 in a rotationally fixed fashion. The sleeve sections are blocked with respect to one another in the first rotational direction, and in the opposite second rotational direction the inner sleeve can rotate freely in the outer sleeve. A first freewheel is therefore provided in the same way, with the result that the spur gear shaft 6 causes the actuating lever 9 to rotate only in the first rotational direction, and in the opposite second rotational direction it drives the output shaft 19. FIG. 3 also shows the sintered bushing 20 which is, however, only indicated schematically, with the shaft section 7 of the spur gear shaft 6, which extends out of the hollow-cylindrical integrally molded-on portion of the transmission housing 3, being adapted in length to the selection of the first freewheel.

Figure 4:
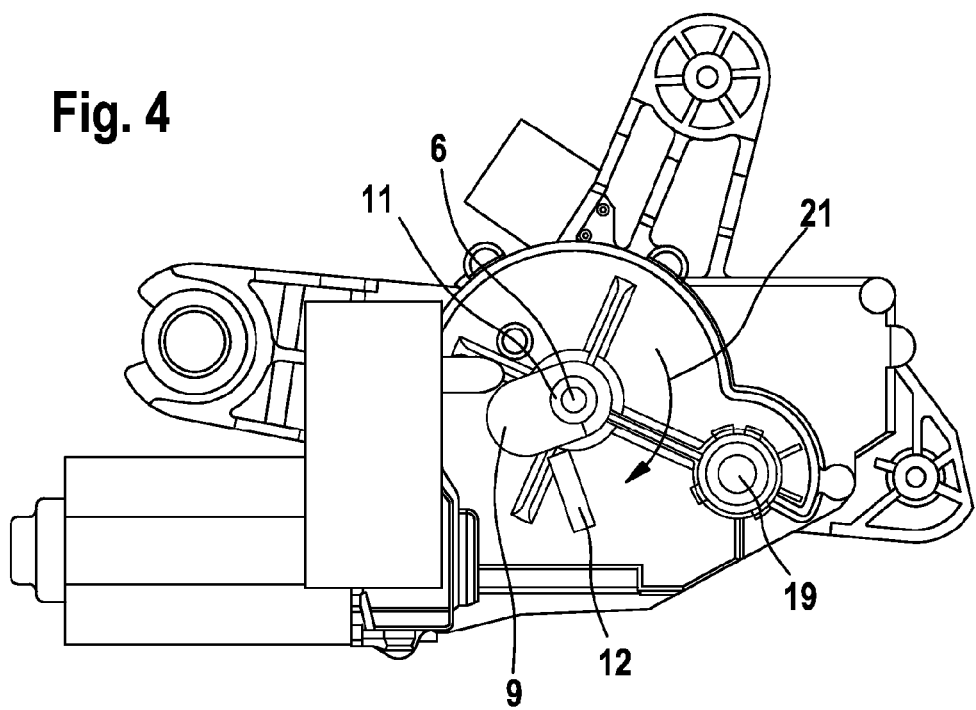
FIG. 4 shows a plan view of the driving device with the first freewheeling device according to the embodiment in FIG. 3.

FIG. 4 shows a plan view of the driving device 1 according to the embodiment in FIG. 3, with the sleeve freewheel 11 also being shown in the plan view from the viewing direction of the extent of the spur gear shaft 6. A spring element 12 is arranged between the actuating lever 9 and the transmission housing 3 in order to prevent undesired rotating back of the actuating lever 9 in the second rotational direction to drive the output shaft 19 and in order to ensure a defined position of the lever. The spring element 12 is then used if the rotational direction of the spur gear shaft 6 is counter to the rotational direction which is clearly illustrated by the arrow 21.

Figure 5:
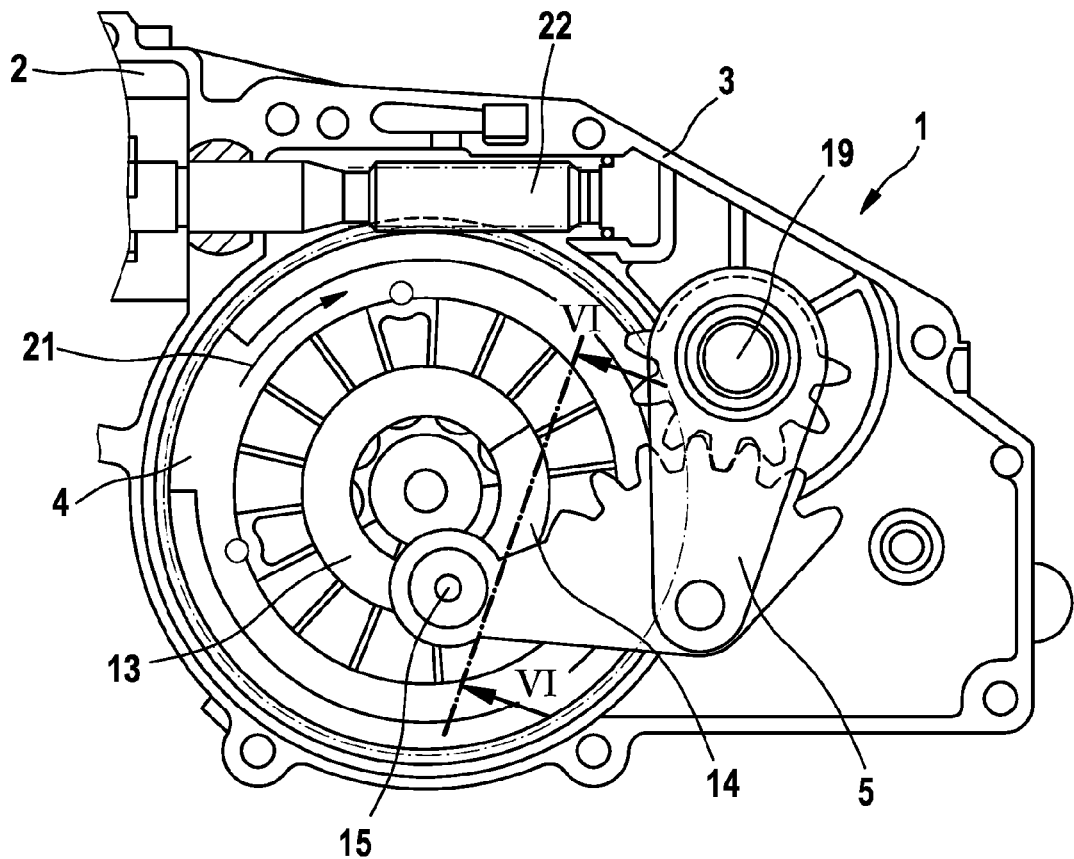
FIG. 5 shows a plan view of the electromechanical driving device in which the second freewheeling device is illustrated.

FIG. 5 illustrates the electromechanical driving device 1 in a plan view, with the viewing direction leading into the interior of the housing 3. The electric motor 2 which drives the spur gear 4 via a worm 22 can be clearly seen. A ramp-shaped raised portion 14 is introduced on the planar side of the spur gear 4, said raised portion 14 being located within a guide path 13 which is introduced circumferentially into the planar side of the spur gear 4. The ramp-shaped raised portion 14 has a run-up side and a stop side which form the respective boundaries of the raised portion 14 in the rotating direction of the guide path 13. A bolt 15 runs in the guide path 13 which is mechanically connected to the transmission arrangement 5. If the spur gear 4 is driven in the direction of the arrow 21, the bolt 15 runs up on the planar side against the stop side of the ramp-shaped raised portion 14. As a result, the force transmitting train to the transmission arrangement 5 is closed, wherein the bolt 15 runs along in the rotating direction of the guide path 13.

Owing to the actuation of the transmission arrangement 5 which is brought about as a result of this, the output shaft 19 can be made to execute an oscillating movement in order to actuate the windshield wiping device. However, if the spur gear rotates counter to the illustrated direction of the arrow 21, the ramp-shaped raised portion 14 runs out of the direction of the run-up side against the bolt 15, with the result that the bolt 15 runs up on the ramp-shaped raised portion 14 and positive locking and therefore transmission of rotational torque between the raised portion 14 and the bolt 15 are prevented.

Figure 6:
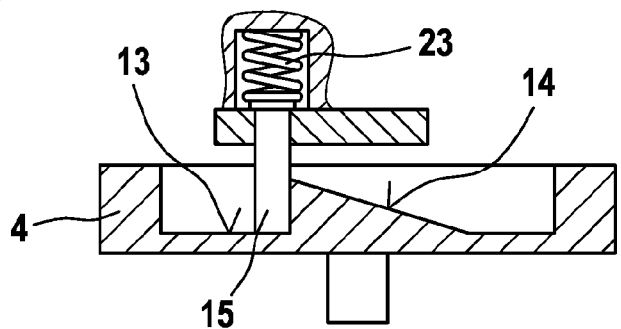
FIG. 6 shows a view of a detail of a possible embodiment of the second freewheeling device according to FIG. 5.

FIG. 6 shows a view of a detail of the second freewheeling device which illustrates the spur gear 4 which is sectioned in the sectional plane VI-VI according to the illustration in FIG. 5. The ramp-shaped raised portion 14 is also illustrated in sectional form, wherein, according to the illustration in FIG. 6, the bolt 15 abuts against the stop side of the raised portion 14, with the result that positive locking occurs between the raised portion 14 and the bolt 15. The bolt 15 is spring-loaded, and in the form illustrated here a compression spring 23 presses against the rear of the bolt in order to press it against the guide path 13.

Figure 7:
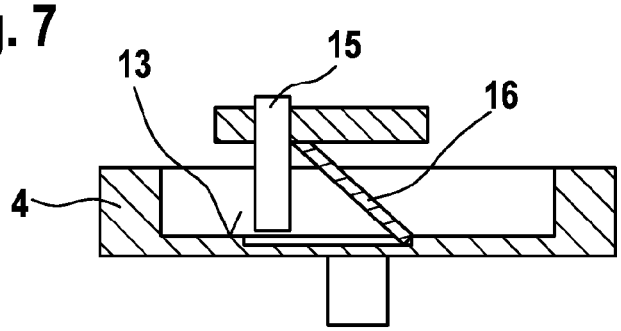
FIG. 7 shows a view of a detail of a second embodiment of the freewheeling device according to FIG. 5.

FIG. 7 shows a further exemplary embodiment of the second freewheeling device and also illustrates the spur gear 4. In order to provide a locking device, a locking spring 16 is arranged between the guide path 13 in the spur gear 4 and the bolt 15. If the spur gear 4 rotates in a first rotational direction, the locking spring 16 can run up against the bolt 15, with the result that the rotational force can be transmitted to the bolt 15 via the locking spring 16. In the opposite direction, the locking spring 16 clicks away under the bolt 15, with the result that the rotational movement is not transmitted to the bolt 15.

Figure 8:
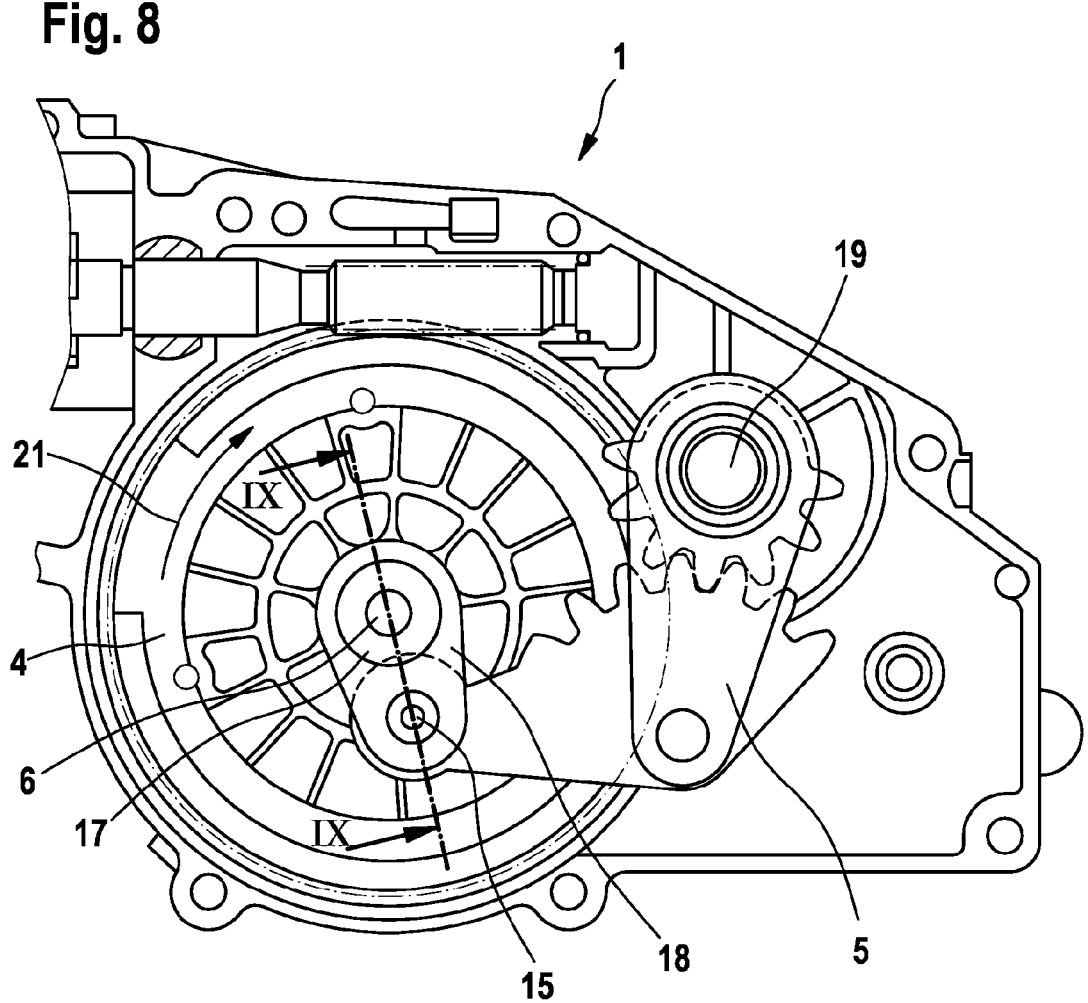
FIG. 8 shows a third embodiment of the second freewheeling device in a plan view of the driving device.
Figure 9:
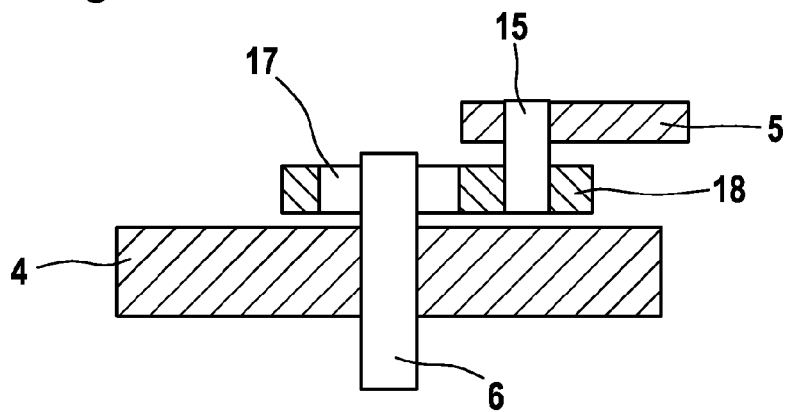
FIG. 9 shows a view of a detail of the third embodiment of the second freewheeling device in a side view.

A further exemplary embodiment of the second freewheeling device is shown by the illustration of the driving device 1 in FIG. 8 in conjunction with FIG. 9. The second freewheeling device is implemented in the form of a sleeve freewheel 17 which is arranged between the spur gear shaft 6 and the transmission lever 18. The connection between the transmission arrangement 5 and the transmission lever 18 is implemented by means of the bolt 15, with the sleeve freewheel 17 transmitting the rotational movement of the spur gear shaft 6 only in the second rotational direction. If the spur gear 4 is driven in the direction of the arrow 21, the sleeve freewheel 17 locks the freewheel, and the rotational movement of the spur gear shaft 6 is transmitted to the transmission lever 18. As a result of the connection by means of the bolt 15, the transmission arrangement is set in motion, and it can cause the output shaft 19 to execute an oscillating movement.

The invention is not restricted in its embodiment to the preferred exemplary embodiment given above. Instead, a number of variants are conceivable which make use of the illustrated solution even in embodiments of a fundamentally different nature. The first freewheeling device between the spur gear shaft 6 or the shaft section 7 and the closing device 8 can, according to the description above, be embodied in at least two different ways, while a plurality of exemplary embodiments are also shown for the second freewheeling device between the spur gear 4 or the spur gear shaft 6 and the transmission arrangement 5. Basically, any type of embodiment of the first freewheeling device can be combined with any type of embodiment of the second freewheeling device.

The invention claimed is:

1. An electromechanical driving device (1) for use in a tailgate of a motor vehicle, having an electric motor (2) for driving in rotation a spur gear (4) which is accommodated in a transmission housing (3) and which is operatively connected to a transmission arrangement (5) in order to drive an output shaft (19) for a windshield wiping device, wherein the spur gear (4) is rotatably accommodated in the transmission housing (3) by means of a co-rotating spur gear shaft (6), characterized in that a shaft section (7) of the spur gear shaft (6) extends out of the transmission housing (3) and means for actuating a closing device (8) for closing the tailgate and/or a tailgate windshield are accommodated on the shaft section (7), characterized in that the means for actuating the closing device (8) comprises a freewheeling device which causes the closing device (8) to be actuated when the spur gear shaft (6) rotates in a first rotational direction, and causes freewheeling of the spur gear shaft (6) in an opposite second rotational direction, characterized in that the freewheeling device has an actuating lever (9) which is accommodated in a co-rotating fashion on the shaft section (7) of the spur gear shaft (6) and is operatively connected to a closing device lever (10) having a wedge shape in the opposite second rotational direction of the actuating lever (9).

2. The electromechanical driving device (1) as claimed in claim 1, characterized in that the actuating lever (9) is of elastically sprung design in the direction of extent of the spur gear shaft (6), such that said actuating lever (9) runs up against the wedge-shaped closing device lever (10) in a positively locking fashion in order to actuate the closing device (8) in the first rotational direction, and, in the second rotational direction, said actuating lever (9) slides in a sprung fashion over the wedge-shaped closing device lever (10) in order to bring about freewheeling of the spur gear shaft (6).

3. The electromechanical driving device (1) as claimed in claim 1, characterized in that a second freewheeling device is arranged between the spur gear (4) and the transmission arrangement (5), which second freewheeling device interrupts transmission of movement to the transmission arrangement (5) when the spur gear (4) rotates in the first rotational direction, and, in the opposite second rotational direction, the second freewheeling device causes the movement to be transmitted.

4. The electromechanical driving device (1) as claimed in claim 3, characterized in that the second freewheeling device comprises a guide groove (13) which is provided in a planar fashion in the spur gear (4) and has a ramp-shaped raised portion (14) in the guide groove (13), wherein a spring-loaded bolt (15), which is connected to the transmission arrangement (5), is guided in the guide groove (13).

5. The electromechanical driving device (1) as claimed in claim 4, characterized in that the ramp-shaped raised portion (14) is bounded by a run-up side and by a stop side, and, during a rotation of the spur gear (4) the bolt (15) slides over the run-up side in the first rotational direction, and, in the case of a rotation in the opposite second rotational direction, the bolt (15) runs up against the stop side in a positively locking fashion, such that movement is transmitted to the transmission arrangement.

6. The electromechanical driving device (1) as claimed in claim 3, characterized in that the second freewheeling device comprises a guide groove (13) which is provided in a planar fashion in the spur gear (4) and which has a ramp-shaped raised portion (14) bounded by a run-up side and by a stop side, and, during a rotation of the spur gear (4), a bolt (15) slides over the run-up side in the first rotational direction, and, in the case of a rotation in the opposite second rotational direction, the bolt (15) runs up against the stop side in a positively locking fashion, such that movement is transmitted to the transmission arrangement.

7. The electromechanical driving device (1) as claimed in claim 3, characterized in that a guide groove (13) which is provided in a planar fashion in the spur gear (4) includes a locking spring (16), wherein, when the spur gear (4) rotates in the first rotational direction, the bolt (15) which is guided in the guide groove (13) slides over the locking spring (16), and, in the case of rotation in the opposite second rotational direction, the bolt (15) runs up in a positively locking fashion against the locking spring (16), such that movement is transmitted to the transmission arrangement.

8. The electromechanical driving device (1) as claimed in claim 1, characterized in that the closing device (8) is arranged on the transmission housing (3).

9. The electromechanical driving device (1) as claimed in claim 8, characterized in that the closing device (8) is arranged on the transmission housing (3) on a side where the shaft section (7) passes out of the transmission housing (3).

10. An electromechanical driving device (1) for use in a tailgate of a motor vehicle, having an electric motor (2) for driving in rotation a spur gear (4) which is accommodated in a transmission housing (3) and which is operatively connected to a transmission arrangement (5) in order to drive an output shaft (19) for a windshield wiping device, wherein the spur gear (4) is rotatably accommodated in the transmission housing (3) by means of a co-rotating spur gear shaft (6), characterized in that a shaft section (7) of the spur gear shaft (6) extends out of the transmission housing (3) and means for actuating a closing device (8) for closing the tailgate and/or a tailgate windshield are accommodated on the shaft section (7), characterized in that the means for actuating the closing device (8) comprises a freewheeling device which causes the closing device (8) to be actuated when the spur gear shaft (6) rotates in a first rotational direction, and causes freewheeling of the spur gear shaft (6) in an opposite second rotational direction, characterized in that the freewheeling device includes a sleeve freewheel (11) which is arranged on the shaft section (7) of the spur gear shaft (6) and on which an actuating lever (9) is accommodated and is operatively connected to a closing device lever (10).

11. The electromechanical driving device (1) as claimed in claim 10, characterized in that a spring element (12) is arranged between the actuating lever (9) and the transmission housing (3) in order to prevent undesired rotating back of the actuating lever (9) in the opposite second rotational direction.

12. The electromechanical driving device (1) as claimed in claim 10, characterized in that a second freewheeling device is arranged between the spur gear (4) and the transmission arrangement (5), which second freewheeling device interrupts transmission of movement to the transmission arrangement (5) when the spur gear (4) rotates in the first rotational direction, and, in the opposite second rotational direction, the second freewheeling device causes the movement to be transmitted.

13. The electromechanical driving device (1) as claimed in claim 12, characterized in that the second freewheeling device comprises a guide groove (13) which is provided in a planar fashion in the spur gear (4) and has a ramp-shaped raised portion (14) in the guide groove (13), wherein a spring-loaded bolt (15), which is connected to the transmission arrangement (5), is guided in the guide groove (13).

14. The electromechanical driving device (1) as claimed in claim 12, characterized in that the second freewheeling device comprises a guide groove (13) which is provided in a planar fashion in the spur gear (4) and which has a ramp-shaped raised portion (14) bounded by a run-up side and by a stop side, and, during a rotation of the spur gear (4), a bolt (15) slides over the run-up side in the first rotational direction, and, in the case of a rotation in the opposite second rotational direction, the bolt (15) runs up against the stop side in a positively locking fashion, such that movement is transmitted to the transmission arrangement.

15. The electromechanical driving device (1) as claimed in claim 12, characterized in that a guide groove (13) which is provided in a planar fashion in the spur gear (4) includes a locking spring (16), wherein, when the spur gear (4) rotates in the first rotational direction, the bolt (15) which is guided in the guide groove (13) slides over the locking spring (16), and, in the case of rotation in the opposite second rotational direction, the bolt (15) runs up in a positively locking fashion against the locking spring (16), such that movement is transmitted to the transmission arrangement.

16. An electromechanical driving device (1) for use in a tailgate of a motor vehicle, having an electric motor (2) for driving in rotation a spur gear (4) which is accommodated in a transmission housing (3) and which is operatively connected to a transmission arrangement (5) in order to drive an output shaft (19) for a windshield wiping device, wherein the spur gear (4) is rotatably accommodated in the transmission housing (3) by means of a co-rotating spur gear shaft (6), characterized in that a shaft section (7) of the spur gear shaft (6) extends out of the transmission housing (3) and means for actuating a closing device (8) for closing the tailgate and/or a tailgate windshield are accommodated on the shaft section (7), characterized in that a freewheeling device is arranged between the spur gear (4) and the transmission arrangement (5), which freewheeling device interrupts transmission of movement to the transmission arrangement (5) when the spur gear (4) rotates in a first rotational direction, and, in an opposite second rotational direction, the freewheeling device causes the movement to be transmitted, characterized in that the freewheeling device a sleeve freewheel (17) which is arranged on the spur gear shaft (6) and on which a transmission lever (18), which is operatively connected to the transmission arrangement (5), is arranged.

17. The electromechanical driving device (1) as claimed in claim 16, characterized in that the means for actuating the closing device (8) comprises another freewheeling device which causes the closing device (8) to be actuated when the spur gear shaft (6) rotates in a first rotational direction, and causes freewheeling of the spur gear shaft (6) in an opposite second rotational direction.

18. The electromechanical driving device (1) as claimed in claim 17, characterized in that the other freewheeling device has an actuating lever (9) which is accommodated in a co-rotating fashion on the shaft section (7) of the spur gear shaft (6) and is operatively connected to a closing device lever (10) having a wedge shape in the opposite second rotational direction of the actuating lever (9).

19. The electromechanical driving device (1) as claimed in claim 18, characterized in that the actuating lever (9) is of elastically sprung design in the direction of extent of the spur gear shaft (6), such that said actuating lever (9) runs up against the wedge-shaped closing device lever (10) in a positively locking fashion in order to actuate the closing device (8) in the first rotational direction, and, in the second rotational direction, said actuating lever (9) slides in a sprung fashion over the wedge-shaped closing device lever (10) in order to bring about free-wheeling of the spur gear shaft (6).

20. The electromechanical driving device (1) as claimed in claim 17, characterized in that the other freewheeling device includes a sleeve freewheel (11) which is arranged on the shaft section (7) of the spur gear shaft (6) and on which the actuating lever (9) is accommodated and is operatively connected to a closing device lever (10).

21. The electromechanical driving device (1) as claimed in claim 20, characterized in that a spring element (12) is arranged between the actuating lever (9) and the transmission housing (3) in order to prevent undesired rotating back of the actuating lever (9) in the opposite second rotational direction.

* * * * *